(12) United States Patent
Tsung-hsun

(10) Patent No.: US 6,683,597 B1
(45) Date of Patent: Jan. 27, 2004

(54) MONITOR CONNECTED WITH A POINTING DEVICE FOR ADJUSTING IMAGES ON A SCREEN

(75) Inventor: Wu Tsung-hsun, Taoyuan (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 09/431,934

(22) Filed: Nov. 1, 1999

(51) Int. Cl.[7] ............................................. G06F 3/14
(52) U.S. Cl. ...................... 345/156; 345/163; 345/835; 345/856
(58) Field of Search ............................ 345/835, 163, 345/856, 840, 156, 157, 184, 710, 214, 84; 300/371, 336, 335, 340

(56) References Cited

U.S. PATENT DOCUMENTS

| | | | | |
|---|---|---|---|---|
| 5,986,638 A | * | 11/1999 | Cheng .......................... | 345/857 |
| 6,188,569 B1 | * | 2/2001 | Minemoto et al. .......... | 361/683 |
| 6,198,473 B1 | * | 3/2001 | Armstrong .................. | 345/163 |
| 6,205,505 B1 | * | 3/2001 | Jau et al. .................... | 710/315 |
| 6,268,845 B1 | * | 7/2001 | Pariza et al. ................ | 345/581 |
| 6,275,375 B1 | * | 8/2001 | Nam .......................... | 361/682 |
| 6,289,466 B1 | * | 9/2001 | Bayramoglu et al. ....... | 713/310 |
| 6,320,576 B1 | * | 11/2001 | Kim .......................... | 345/214 |
| 6,339,435 B1 | * | 1/2002 | Kim .......................... | 345/690 |
| 6,400,377 B1 | * | 6/2002 | Hiraka et al. ............... | 345/716 |
| 6,477,594 B1 | * | 11/2002 | Tung .......................... | 710/104 |

OTHER PUBLICATIONS

Philips Semiconductors USB taking off as the industry rolls out monitors with hubs, Jul. 1, 1999.*

* cited by examiner

Primary Examiner—Kristine Kincaid
Assistant Examiner—Thomas T. Nguyen
(74) Attorney, Agent, or Firm—Winston Hsu

(57) ABSTRACT

A monitor connected to a computer and a pointing device. The monitor comprises a screen for displaying images, an on-screen display (OSD) control unit for displaying on-screen images on the screen, a monitor control unit for controlling operations of the on-screen display control unit, and an input-output (I/O) control unit electrically connected to the monitor control unit for receiving input signals transmitted from the pointing device and passing them to the computer and the monitor control unit. When the monitor control unit detects an "OSD start" signal within the input signals from the pointing device, the monitor control unit will initiate the OSD control unit to display on-screen images on the screen and stop the I/O control unit from passing the input signals to the computer, and then the monitor control unit will pass the input signals from the pointing device to the OSD control unit to control operations of the OSD control unit.

28 Claims, 4 Drawing Sheets

MONITOR CONNECTED WITH A POINTING DEVICE FOR ADJUSTING IMAGES ON A SCREEN

BACKGROUND OF THE INVENTION

1. Field of the Invention

The present invention relates to a monitor, and more particularly, to a monitor connected with a pointing device for adjusting images on a screen.

2. Description of the Prior Art

A prior art computer monitor, such as a desktop monitor or a liquid crystal display, commonly has several control buttons for adjusting and calibrating images on a screen. Although different monitors have similar control modes of operations, they use quite different control buttons installed on their housings to adjust their images. The control buttons not only make mechanical structures in the monitors very complicated, but also create a headache for a user to familiarize operations of the control buttons.

In order to avoid using the control buttons, monitors with fewer control buttons have been developed to adjust and calibrate images. Such monitors use a control button installed on their housings to initiate a display control program by inputting image adjustment and calibration icons through a window-based user interface. Although this design can greatly simplify mechanical structures in the monitors and can make controls of the images fairly easy, it still requires the user to become familiar with uses of the control button.

SUMMARY OF THE INVENTION

It is therefore a primary objective of the present invention to provide a monitor connected to a pointing device to solve the above mentioned problems.

In a preferred embodiment, the present invention provides a monitor connected to a computer and a pointing device providing input signals, the monitor comprising:

- a screen;
- an on-screen display (OSD) control unit for displaying on-screen images on the screen;
- a monitor control unit for controlling operations of the on-screen display control unit;
- an input-output control unit for receiving the input signals and passing them to the computer and the monitor control unit;
- wherein when the monitor control unit detects a predetermined "OSD start" signal presented within the input signals, the monitor control unit triggers the OSD control unit to display the on-screen images, and then the operations of the OSD control unit are controlled by the input signals.

It is an advantage of the present invention that a user can easily adjust and calibrate images on the screen without using buttons on the monitor.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
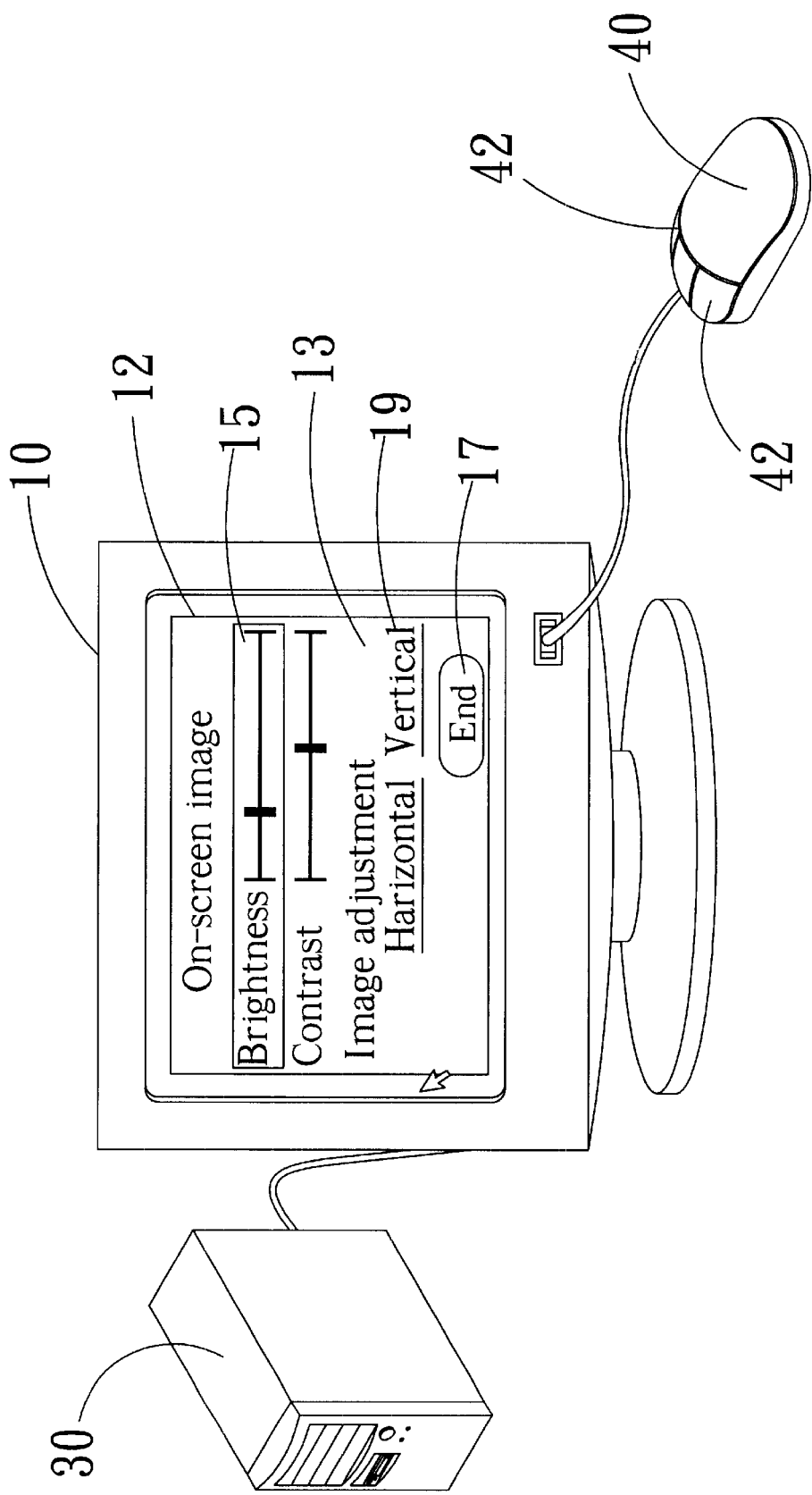
FIG. 1 is a perspective view of a monitor according to the present invention.
Figure 2:
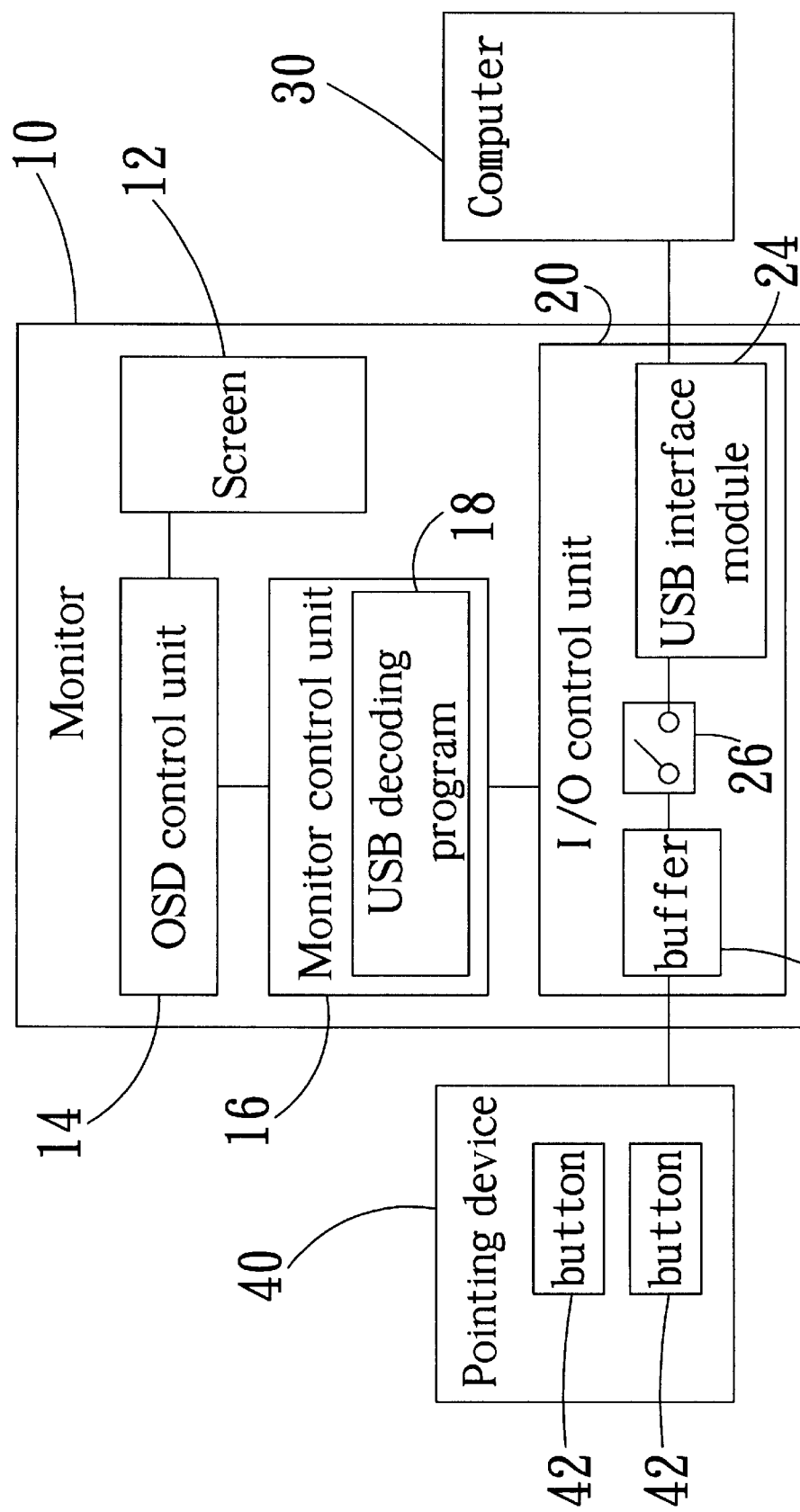
FIG. 2 is a functional block diagram of the monitor shown in FIG. 1.

Please refer to FIG. 1 and FIG. 2. FIG. 1 is a perspective view of a monitor 10 according to the present invention. FIG. 2 is a functional block diagram of the monitor 10 shown in FIG. 1. The monitor 10 is electrically connected with both the computer 30 and the pointing device 40 for displaying video signals transmitted from the computer 30 on the screen and transmitting input signals from the pointing device 40 to the computer 30. The monitor 10 comprises a screen 12 for displaying video signals, an on-screen display (OSD) control unit 14 for displaying on-screen images 13 on the screen 12, a monitor control unit 16 for controlling operations of the on-screen display control unit 14 (ON/OFF of the OSD-images, switching the highlighted area 15 of various icons), and an input-output (I/O) control unit 20 electrically connected to the monitor control unit 16 for receiving input signals transmitted from the pointing device 40 and passing them to the computer 30 and the monitor control unit 16. The pointing device 40 is a USB (universal serial bus) interface input device comprising left and right buttons 42 for generating USB input signals. The monitor control unit 16 comprises a USB decoding program 18 for decoding the USB input signals from the pointing device 40.

The I/O control unit 20 comprises a USB interface module 24 electrically connected to the computer 30 for sending the USB input signals from the monitor 10 to the computer 30, a buffer 22 electrically connected between the pointing device 40 and the USB interface module 24 for temporarily storing the USB input signals transmitted from the pointing device 40, and a buffer switch 26 for controlling the connection between the buffer 22 and the USB interface module 24. The USB input signals generated by the pointing device 40 are initially transmitted to the I/O control unit 20 and stored in the buffer 22, and then the monitor control unit 16 will pick up these USB input signals in a polling manner and decode them through the USB decoding program 18 to detect if these input signals comprise an "OSD start" signal.

When the monitor control unit 16 detects an "OSD start" signal within the input signals stored in the buffer 22, the monitor control unit 16 will trigger the OSD control unit 14 to display the on-screen images 13 on the screen 12 and then the operations of the OSD control unit are controlled by the input signals transmitted from the pointing device 40. The monitor control unit 16 may also make the I/O control unit 20 turn off (disconnect) the buffer switch 26 thus preventing input signals stored in the buffer 22 from being forwarded to the computer 30. The monitor control unit 16 will then pass the input signals from the pointing device 40 to the video display circuit (for example: CRT deflection circuit) to adjust the video display of the monitor 10, and the OSD control unit 14 to display the corresponding adjustment process on the on-screen images 13.

After finishing the adjustment process, the user can send out an "OSD stop" signal from the pointing device 40 to the monitor 10. When the "OSD stop" signal has been decoded and recognized by the monitor control unit 16, then the monitor control unit 16 will (1) make the OSD control unit 14 stop displaying the on-screen images 13, and (2) turn on (connect) the buffer switch 26 and start transmitting the input signals from the pointing device 40 to the computer 30 through the USB interface module 24.

Figure 3:
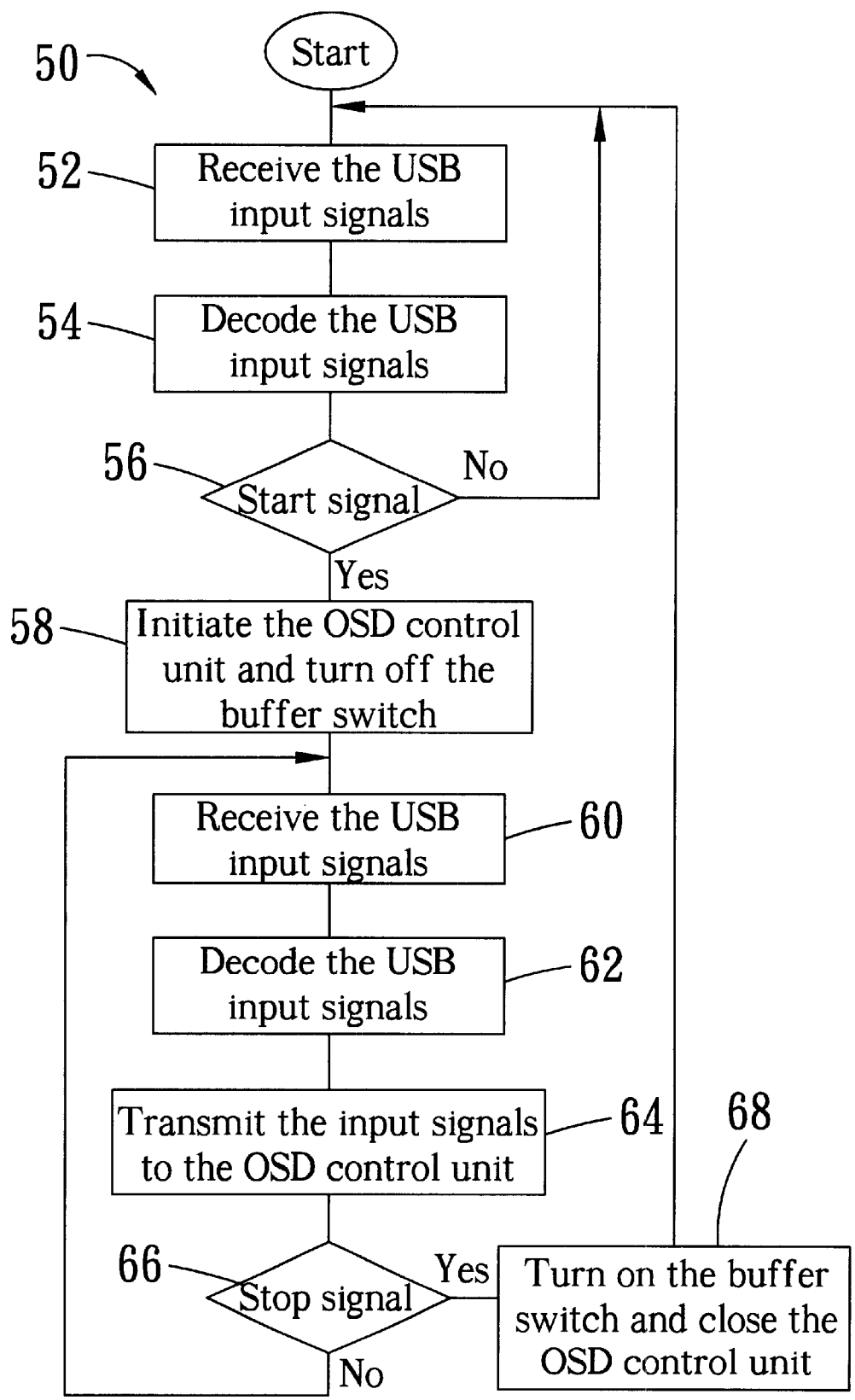
FIG. 3 is a flowchart of a control method of the monitor control unit shown in FIG. 2.

Please refer to FIG. 3. FIG. 3 is a flowchart of a control method 50 of the monitor control unit 16 shown in FIG. 2. The control method 50 comprises the following steps:

Step 52: the buffer 22 receives the USB input signals;

Step 54: the monitor control unit 16 decodes the USB input signals stored in the buffer 22;

Step 56: the monitor control unit 16 checks if the decoded USB input signals comprise an "OSD start" signal; if not, go to step 52;

Step 58: the monitor control unit 16 triggers the OSD control unit 14 to display on-screen images 13 on the screen 12, and then turns off (disconnects) the buffer switch 26;

Step 60: the buffer 22 receives more USB input signals;

Step 62: the monitor control unit 16 decodes the newly received USB input signals;

Step 64: the video display circuit adjusts the video display of the monitor 10 based on the decoded USB input signals, and the OSD control unit 14 displays the corresponding adjustment process in the on-screen images 13;

Step 66: the monitor control unit 16 checks whether the "OSD stop" signal is received—the end icon 17 is selected from the on-screen images 13 by highlighting its area 15 and then pressing the left button 42; if no "OSD stop" signal, then go to step 60;

Step 68: the monitor control unit 16 triggers the OSD control unit 14 to close the on-screen images 13 and turns on (connects) the buffer switch 26;

go to step 52.

When the monitor 10 is in standard operating mode, the pointing device 40 outputs USB input signals to the computer to control a cursor on the screen 12 to move or select window icons, and the monitor control unit 16 will continue polling and receiving all the USB input signals temporarily stored in the buffer 22 and perform USB decoding to check for an "OSD start" signal. The USB input signals stored in the buffer 22 are transmitted through the USB interface module 24 to the computer 30 as long as the "OSD start" signal is not detected.

When the OSD input signals outputted by the pointing device 40 contain an "OSD start" signal, the monitor 10 will enter into adjustment mode, and the monitor control unit 16 will then trigger the OSD control unit 14 to display on-screen images 13 on the screen 12 and instruct the I/O control unit 20 to turn off (disconnect) the buffer switch 26. This stops the passage of the USB input signals generated from the pointing device 40 to the computer 30, and initiates transmissions of the USB input signals from the pointing device 40 to the video display circuit (not shown) to adjust the video display of the monitor 10, and the OSD control unit 14 displays the corresponding adjustment process in the on-screen images 13 on the screen 12.

When the monitor control unit 16 receives the "OSD stop" signal, it will cause the OSD control unit 14 to stop displaying the on-screen images 13 on the screen 12 and turn on the buffer switch 26 to allow the input signals to pass from the pointing device 40 to the computer 30. The monitor 10 returns to its standard operating mode, and the monitor control unit 16 will continue to poll the USB input signals to check if they contain an "OSD start" signal again.

To start the adjustment process in step 56, the "OSD start" signal is generated by simultaneously depressing the two buttons 42 on the pointing device 40 to trigger the OSD control unit 14 to display the on-screen images 13. Then, the click of the two buttons 42 and a movement of the pointing device 40 can be used to select one of various icons to adjust various features of the video display on the screen 12 such as brightness, contrast, position and size of the screen. A highlighted area 15 appears on the OSD-images to indicate which of the icons has been selected. The highlighted area 15 can be switched from one adjustment icon to another icon when the pointing device moves in a first dimension—forward (away from user) or backward (towards user). The corresponding adjustment process of the selected icon is then performed when the pointing device moves in a second dimension—left or right.

As shown in FIG. 1, if the user wants to adjust the brightness of the video display, then the pointing device 40 can be moved forward or backward to make the highlighted area 15 select the "Brightness" icon, and then moving the pointing device 40 in the left or right direction to adjust the brightness level. When the user has finished the adjustment process, the highlighted area 15 can be switched from the "vertical" icon 19 to the "end" icon 17 by moving the pointing device 40 backwards, and then pressing the left button 42 to close the on-screen images 13 on the screen 12.

Figure 4:
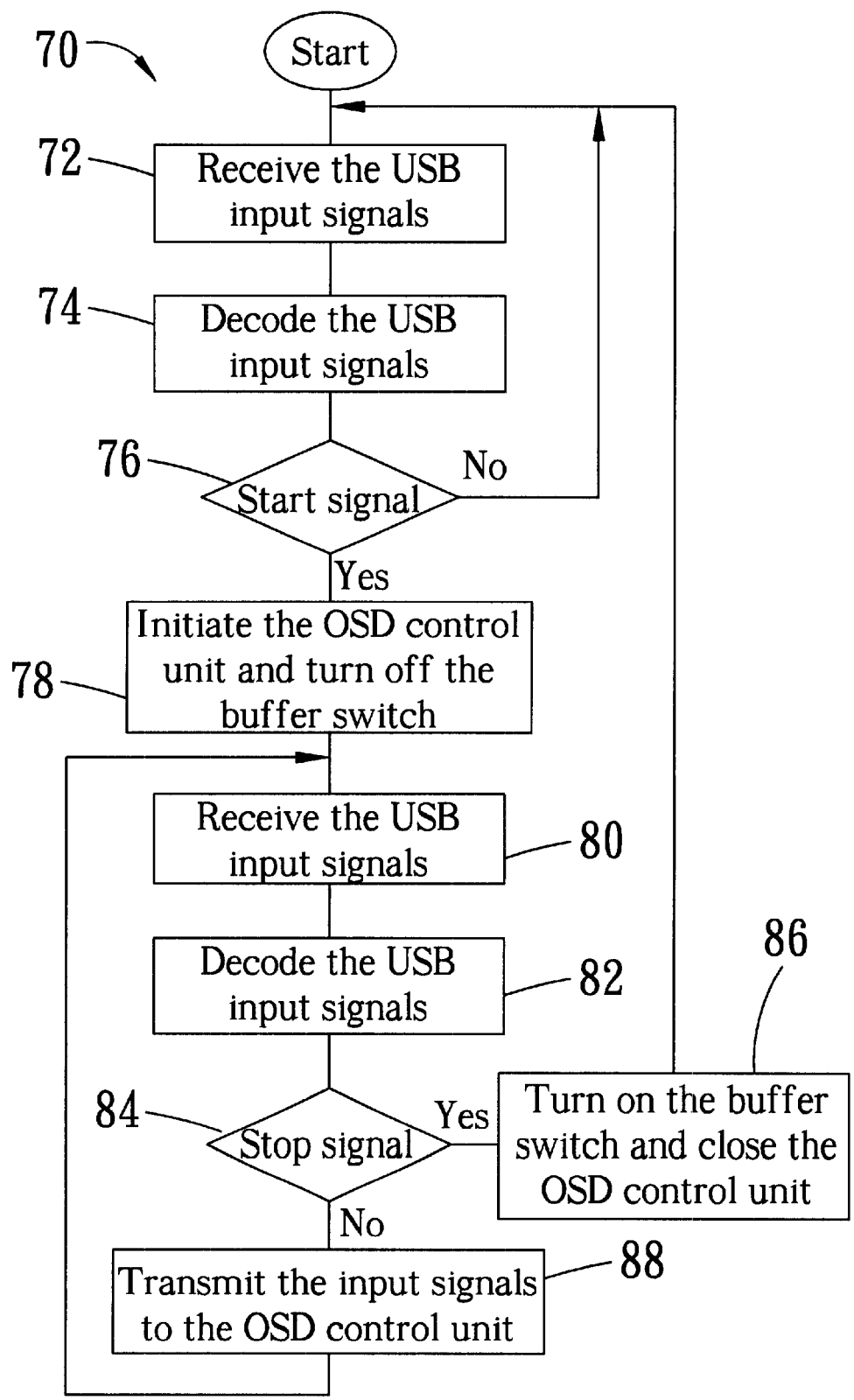
FIG. 4 is a flowchart of another control method of the monitor control unit according to the present invention.

Please refer to FIG. 4. FIG. 4 is a flowchart of second embodiment control method 70 of the monitor control unit 16 according to the present invention. The control method 70 comprises the following steps:

Step 72: receive USB input signals;

Step 74: decode the USB input signals;

Step 76: check if the decoded USB input signals comprise an "OSD start" signal; if not, go to step 72;

Step 78: initiate the OSD control unit 14 to display on-screen images 13 on the screen 12, and turn off the buffer switch 26;

Step 80: receive USB input signals;

Step 82: decode the USB input signals;

Step 84: the monitor control unit 16 checks whether the decoded USB input signals comprise an "OSD stop" signal—the left button and right button 42 are depressed simultaneously; if not, go to step 88;

Step 86: use the OSD control unit 14 to close the on-screen images 13 on the screen 12 and turn on the buffer switch 26; go to step 72;

Step 88: transmit the decoded USB input signals to the OSD control unit 14 to adjust the images on the screen 12; go to step 80.

The major difference between the control method 70 shown in FIG. 4 and the control method 50 shown in FIG. 3 is the manner in which the on-screen images 13 are closed. In the control method 70, when the predetermined "OSD stop" signal is present within the input signals—the two buttons 42 of the pointing device 40 are simultaneously depressed then the monitor control unit 16 makes the OSD control unit 14 stop displaying the on-screen images 13 on the screen 12. However, in the control method 50, the "OSD stop" signal is generated when the highlighted area 15 is switched to the "end" icon 17 and the left button 42 is clicked to close the on-screen images 13. Therefore in step 84, the monitor control unit 16 checks if the decoded USB input signals contain the "OSD stop" signal to decide if further adjustments of the images are needed or not.

In contrast to the prior art monitors, the monitor 10 is connected to both the computer 30 and the pointing device 40. The pointing device 40 can be used to adjust the video display of the monitor 10 by using the on-screen images 13 through a very simple process—moving the pointing device forward, backward, left, and right. The use of the OSD control unit 14 also allows more accurate and subtle adjustments. Furthermore, the monitor control unit 16 and the OSD control unit 14 are stored in the monitor 10 and control programs for adjusting the images that are stored in the OSD control unit 14, so the monitor 10 can be easily connected to computers in different operating systems without needing specific control programs or device drivers. The monitor 10 of the present invention does not have display control buttons installed and therefore is less costly.

In the above embodiment, the monitor control unit 16 actively polls to pick up the USB input signals in the buffer 22 to detect if they contain the "OSD start" signal. However, a detecting circuit can be installed in the I/O control unit 20 to check the presence of the "OSD start" signal. When the detecting circuit detects an "OSD start" signal, it will actively inform the monitor control unit 16 to start the OSD control unit 14 to display the on-screen images 13 on the screen 12 and make the I/O control unit 20 turn off the buffer switch 26 to stop the input signals stored in the buffer 22 from being transmitted to the computer 30.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A monitor electrically connected to a computer and a pointing device providing input signals, the monitor comprising:
    a screen;
    an on-screen display (OSD) control unit for displaying on-screen images on the screen;
    a monitor control unit for controlling operations of the on-screen display control unit;
    an input-output control unit for receiving the input signals and passing them to the computer and the monitor control unit, a simultaneous depressing of a combination of a plurality of buttons of the pointing device generating a predetermined "OSD start" signal in the input signals;
    wherein when the monitor control unit detects the "OSD start" signal presented within the input signals, the monitor control unit triggers the OSD control unit to display the on-screen images, and then the operations of the OSD control unit are controlled by the signals.

2. The monitor of claim 1 wherein when the monitor control unit detects a predetermined "OSD stop" signal presented within the input signals, the monitor control unit makes the OSD control unit stop displaying the on-screen images on the screen.

3. The monitor of claim 1 wherein the on-screen images comprise a plurality of icons and a highlighted area to indicate one of the icons being selected, and the highlighted area is switched between the icons when the pointing device moves in a first dimension.

4. The monitor of claim 3 wherein an adjustment process corresponding to the selected icon is performed when the pointing device moves in a second dimension.

5. The monitor of claim 1 wherein when the monitor control unit detects a predetermined "OSD start" signal presented within the input signals, the monitor control unit makes the input-output control unit stop passing the input signals to the computer.

6. The monitor of claim 1 wherein the pointing device comprises a button, the on-screen images comprise an end icon and a highlighted area to indicate whether the end icon is being selected, when the highlighted area is switched onto the end icon and the button is then depressed, the monitor control unit makes the OSD control unit stop displaying the on-screen images on the screen.

7. A monitor electrically connected to a computer and a pointing device providing input signals, comprising:
    a screen;
    an on-screen display (OSD) control unit for displaying on-screen images on the screen, the on-screen images comprising a plurality of icons and a highlighted area to indicate one of the icons being selected, and the highlighted area is switched between the icons when the pointing device moves in a first dimension;
    a monitor control unit for controlling operations of the on-screen display control unit; and
    an input-output control unit for receiving the input signals and passing input signals received from the pointing device to the computer before the monitor control unit detects a predetermine start signal presented within the input signals and passing input signals received from the pointing device to the OSD control unit through the monitor control unit to display the on-screen images and control operations of the OSD control unit after the monitor control unit detects the predetermined start signal presented within the input signals.

8. The monitor of claim 7 wherein an adjustment process corresponding to the selected icon is performed when the pointing device moves in a second dimension.

9. The monitor of claim 7 wherein when the monitor control unit detects the predetermined start signal presented within the input signals, the monitor control unit makes the OSD control unit start displaying the on-screen images on the screen.

10. The monitor of claim 7 wherein when the monitor control unit detects a predetermined "OSD stop" signal presented within the input signals, the monitor control unit makes the OSD control unit stop displaying the on-screen images on the screen.

11. A monitor electrically connected to a computer and a pointing device providing input signals, the monitor comprising:
    a screen;
    an on-screen display (OSD) control unit for displaying on-screen images on the screen, the on-screen images comprising a plurality of icons and a highlighted area to indicate one of the icons being selected, and the highlighted area is switched between the icons when the point device moves in a first dimension;
    a monitor control unit for controlling operations of the on-screen display control unit;
    an input-output control unit for receiving the input signals and passing them to the computer and the monitor control unit;
    wherein when the monitor control unit detects a predetermined "OSD start" signal presented within the input signals, the monitor control unit triggers the OSD control unit to display the on-screen images, and then the operations of the OSD control unit are controlled by the input signals.

12. The monitor of claim 11 wherein the pointing device comprises a plurality of buttons and the "OSD start" signal is generated by simultaneously depressing a predetermined combination of the buttons.

13. The monitor of claim 11 wherein when the monitor control unit detects a predetermined "OSD stop" signal presented within the input sis, the monitor control unit makes the OSD control unit stop displaying the on-screen images on the screen.

14. The monitor of claim 11 wherein an adjustment process corresponding to the selected icon is performed when the pointing device moves in a second dimension.

15. The monitor of claim 11 wherein when the monitor control unit detects a predetermined "OSD start" signal presented within the input signals, the monitor control unit makes the input-output control unit stop passing the input signals to the computer.

16. The monitor of claim 11 wherein the pointing device comprises a button, the on-screen images comprise an end icon and a highlighted area to indicate whether the end icon is being selected, when the highlighted area is switched onto the end icon and the button is then depressed, the monitor control unit makes be OSD control unit stop displaying the on-screen images on the screen.

17. A monitor electrically connected to a computer and a pointing device providing input signals, the monitor comprising:

a screen;

an on-screen display (OSD) control unit for displaying on-screen images on the screen;

a monitor control unit for controlling operations of the on-screen display control unit;

an input-output control unit for receiving the input signals and passing them to the computer and the monitor control unit;

wherein when the monitor control unit detects a predetermined "OSD start" signal presented within the input signals, the monitor control unit triggers the OSD control unit to display the on-screen images, the operations of the OSD control unit are controlled by the input signals, and the monitor control unit makes the input-output control unit stop passing the input signals to the computer.

18. The monitor of claim 17 wherein the pointing device comprises a plurality of buttons and the "OSD start" signal is generated by simultaneously depressing a predetermined combination of the buttons.

19. The monitor of claim 17 wherein when the monitor control unit detects a predetermined "OSD stop" signal presented within the irrupt signals, the monitor control unit makes the OSD control unit stop displaying the on-screen images on the screen.

20. The monitor of claim 17 wherein the on-screen images comprise a plurality of icons and a highlighted area to indicate one of the icons being selected, and the highlighted area is switched between the icons when the pointing device moves in a first dimension.

21. The monitor of claim 20 wherein an adjustment process corresponding to the selected icon is performed when the pointing device moves in a second dimension.

22. The monitor of claim 17 wherein the pointing device comprises a button, the on-screen images comprise an end icon and a highlighted area to indicate whether the end icon is being selected, when the highlighted area is switched onto the end icon and the button is then depressed, the monitor control unit makes the OSD control unit stop displaying the on-screen images on the screen.

23. A monitor electrically connected to a computer and a pointing device providing input signals, the monitor comprising:

a screen;

an on-screen display (OSD) control unit for displaying on-screen images on the screen, the on-screen images comprising an end icon and a highlighted area to indicate whether the end icon is being selected;

a monitor control unit for controlling operations of the on-screen display control unit;

an input-output control unit for receiving the input signals and passing them to the computer and the monitor control unit;

wherein when the monitor control unit detects a predetermined "OSD start" signal presented within the input signals, the monitor control unit triggers the OSD control unit to display the on-screen images, and then the operations of the OSD control unit are controlled by the input signals; when the highlighted area is switched onto the end icon and a button of the pointing device is then depressed, the monitor control unit makes the OSD control unit stop displaying the on-screen images on the screen.

24. The monitor of claim 23 wherein the pointing device comprises a plurality of buttons and the "OSD start" signal is generated by simultaneously depressing a predetermined combination of the buttons.

25. The monitor of claim 23 wherein when the monitor control unit detects a predetermined "OSD stop" signal presented within the input signals, the monitor control unit makes the OSD control unit stop displaying the on-screen images on the screen.

26. The monitor of claim 23 wherein the on-screen images comprise a plurality of icons and a highlighted area to indicate one of the icons being selected, and the highlighted area is switched between the icons when the pointing device moves in a first dimension.

27. The monitor of claim 26 wherein an adjustment process corresponding to the selected icon is performed when the pointing device moves in a second dimension.

28. The monitor of claim 23 wherein when the monitor control unit detects a predetermined "OSD start" signal presented within the input signals, the monitor control unit makes the input-output control unit stop passing the input signals to the computer.

* * * * *